United States Patent Office 3,470,214
Patented Sept. 30, 1969

3,470,214
ISOMERIZATION OF TETRAHYDROPHTHALIC ANHYDRIDE
Freeman M. Young, Spartanburg, S.C., assignor to Air Products and Chemicals Inc., Philadelphia, Pa., a corporation of Delaware
No Drawing. Continuation-in-part of application Ser. No. 409,562, Nov. 6, 1964. This application Apr. 23, 1968, Ser. No. 723,625
Int. Cl. C07d 5/38, 5/32
U.S. Cl. 260—346.3                                    13 Claims

ABSTRACT OF THE DISCLOSURE

Normally solid tetrahydrophthalic anhydrides are converted to their normally liquid isomers by a catalytic reaction wherein the catalyst is a solid, particulate, acidic, siliceous cracking catalyst. Reaction takes place at elevated temperatures. The catalyst, which is insoluble, can be recovered for further use by simple physical separation (e.g. filtration). The liquid isomers made by this process find utility as epoxy resin curing agents.

CROSS-REFERENCE TO RELATED APPLICATION

This application is a continuation-in-part of application No. 409,562 filed Nov. 6, 1964, now abandoned.

BACKGROUND OF THE INVENTION

Field of the invention.—The present invention is concerned with catalytic isomerization processes. More particularly, it relates to a method of isomerizing a normally solid tetrahydrophthalic anhydride to its normally liquid isomers utilizing a siliceous acid cracking catalyst.

Description of the prior art.—The desirability of producing isomers of dibasic acid anhydrides has been recognized for some time. In many applications the normally solid cyclo-olefinic acid anhydride such as, for example, phthalic anhydride, is undesirable because of its relatively high melting point (i.e. 131° C.). On the other hand, the isomer is normally liquid and has distinct advantages in certain applications such as epoxy resin curing.

Prior art catalytic processes for the isomerization of anhydrides of this type include Bailey, U.S. Patent No. 2,959,599. Bailey achieves isomerization by heating the molten anhydride for extended periods of time at relatively high temperatures. He uses strong mineral acids as catalysts such as for example, $H_2SO_4$, $H_3PO_4$, their acid halides, salts, and anhydrides including $P_2O_5$ and $SO_3$. His process results in the formation of a tarry residue. The existence of this residue, plus the fact that the catalysts themselves are soluble in the reactants, requires separation by distillation. Note, for example, that in Bailey's Example 2 (col. 3, line 9 et seq.) 600 grams of anhydride with 9 grams of $P_2O_5$ catalyst yielded 87 grams of tarry residue. Consequently, distillation was required to recover the product. Note also (col. 4, line 14) that silica gel was found ineffective as a catalyst.

Another pertinent prior art patent is Barney, U.S. Patent No. 2,764,597. Barney utilizes as a catalyst palladium or ruthenium and discloses (col. 2, lines 21–29) the unsuitability of a wide variety of materials including alumina. While the catalyst can be filtered off from the reaction mass, it is necessary to use fractional distillation or crystallization to recover the desired product. Needless to say, palladium and ruthenium are relatively rare materials, currently costing respectively, about $44 and $50 per troy ounce.

On the other hand, there is a class of solid catalysts well known in the petroleum refining art called cracking catalysts which are particulate acidic siliceous materials. These commercial and inexpensive compositions include inter alia those of the silica-alumina type which typically contain from 95 to 50% alumina by weight.

Catalysts of this type cannot be characterized solely by their chemical composition since such a characterization misses an essential and critical parameter, namely, their activity. This parameter has been found capable of correlated numerical expression by use of a quinoline number. Essentially this number is a measure of the acidity of the catalyst as a funcation of its chemisorption capacity for quinoline, expressed in milliequivalents of quinoline chemisorbed per gram of catalyst. These values, it has been found, bear a definite correlated relationship to catalytic activity.

The details of the standard quinoline test are described by G. A. Mills, et al. in "Chemical Characterization of Cracking Catalysts" JACS (1950) vol. 72, pages 1554–1560. Briefly, in this test, the catalyst is suspended in a perforated glass basket by a glass wire attached to one end of the beam of an analytical balance. Nitrogen at a constant pressure is then passed through a series of saturators containing liquid quinoline maintained at a constant temperature by a jacket containing boiling liquid. The nitrogen gas, saturated with quinoline, is passed through preheated vapor transfer lines into contact with the catalyst sample. Flow is continued until a relatively constant weight is observed, and a stream of preheated nitrogen gas is then passed over the catalyst to remove physically held quinoline until a substantially constant weight is observed. The difference in weight before contact with quinoline and after the nitrogen purge is taken as the amount of quinoline chemisorbed. Thus, solid acidic siliceous cracking catalyst can be characterized by their quinoline number.

BRIEF SUMMARY OF THE INVENTION

Briefly summarized, the invention comprises a method of catalytically converting normally solid cyclo-olefinic organic acid anhydrides such as, for example, delta-3-tetra-hydrophthalic anhydride, delta-4-tetrahydrophthalic anhydride and $C_1$ to $C_3$ alkyl substituted derivatives thereof to normally liquid isomers thereof utilizing catalytic amounts of readily available, solid, particulate, acidic, silica-alumina cracking catalysts having a quinoline number of at least 0.01.

The method involves heating the normally solid anhydride, contacting the thus liquefied anhydride with the catalyst and maintaining the reactant at temperatures in the range of 100° to 250° C. for an extended time at atmospheric or superatmospheric pressure, until a nuclear double bond shift occurs, and liquid isomer is formed. Because the catalyst is solid and particulate as well as insoluble in the reactant, it can be quantitatively recovered by a simple physical unit operation such as filtration and reused in the process. No distillative separation is required.

Accordingly, it is an object of the invention to provide a method of isomerizing various tetrahydrophthalic anhydrides and derivatives thereof utilizing an inexpensive, readily available material as a catalyst, namely, a siliceous cracking catalyst.

It is a further object of the invention to provide a method for isomerizing tetrahydrophthalic anhydride and related compounds which gives a high yield of isomers, which avoids costly fractionation and which permits a substantially complete recovery of catalyst.

The foregoing abstract of the disclosure and summary of the invention are inserted merely as aids for information retrieval.

DESCRIPTION OF PREFERRED EMBODIMENTS

The non-limiting examples which follow illustrate the use of the inventive method to convert normally solid cycloolefinic organic acid anhydrides to mixtures of isomeric anhydrides which are normally liquid at ordinary temperatures. This is achieved by contacting the normally solid anhydrides, in liquid phase (e.g. by raising the temperature to at least their liquefaction temperature) with a solid particulate acidic siliceous cracking catalyst having a quinoline number of at least 0.01, preferably in the range from 0.01 to 0.09. The reaction conditions include a temperature in the range of about 100° C. to 250° C., a reaction time on the order of 5 minutes to 8 hours and a pressure from atmospheric to 5 atmospheres.

While not critical, it is preferable, particularly in the case of Δ-4-tetrahydrophthalic anhydride (henceforth therein THPA) to conduct the reaction in a dry inert gas atmosphere to minimize formation of undesired products. The normally liquid mixed isomeric anhydrides formed are extremely useful for low temperature blending with liquid or viscous epoxy resins, in connection with which they are used as curing agents. Further, their use in such applications improves the pot life of the resins.

The temperatures utilized must, of course, be above the melting point of the normally solid starting material. A temperature range of about 100° C. to 250° C. is preferred. Temperatures above about 250° C. are not only unnecessary but are actually undesirable if polymer formation is to be held to a minimum and if the yields of desired isomers are to be maximized. Isomerization temperatures will vary, within the described range, depending on the freshness and the activity of the particular catalyst used as well as the ease of isomerization of the particular nuclear double bond involved. Thus, for example, mono-methyl tetrahydrophthalic anhydrides may isomerize more readily than unsubstituted or di-methyl substituted tetrahydrophthalic anhydrides. Consequently for these compounds, the reaction can be realized at a lower temperature and/or shorter time of reaction.

In the preferred method the isomerization is effected by contacting the normally solid anhydride with the specified catalyst. As used herein, the term "contacting" encompasses suspending the catalyst in a body of the liquefied anhydride. This technique results in a suspension of finely divided catalyst in the liquid which can be completely recovered by simple filtration, since the catalyst is insoluble in both the liquefied normally solid anhydride and the normally liquid isomers. Also encompassed by the term are equivalent techniques such as passing the liquefied anhydride through a heated fixed bed of suitable catalyst in particulate form at a mass rate which gives the desired contact time and conversion. This method of contacting may require minor modifications of the contact conditions of a type which are within the ambit of persons skilled in the art and such methods consequently are within the scope of the invention.

The solid particulate catalysts suitable for the process have been generally described above and have been characterized as solid, particulate siliceous, acidic cracking catalysts. Such siliceous catalysts include activated kaolin catalysts produced by the methods described in U.S. Patent No. 2,904,520. Other siliceous cracking catalysts which may be employed, under substantially similar conditions, include acid-activated bentonite clays and synthetic catalysts of the silica-alumina type, or such siliceous synthetics containing zirconia or magnesia in lieu of all or part of the alumina such as, for example, the synthetic silica-magnesia-alumina catalysts described in U.S. Patent No. 2,688,002. The siliceous cracking catalysts which are suitable are those having a quinoline number of from about 0.01 to 0.09 (me./g.) as determined in the quinoline test described above.

When silica-alumina catalysts (95–50% silica, 5–50% alumina) are used, it is preferred to use those having the following physical characteirstics:

| | |
|---|---|
| Surface area _____ m.²/g__ | 300–500 |
| Bulk density _____ kg./l__ | 0.53–0.90 |
| Porosity _____ vol. percent__ | 57–65 |
| Absorption _____ wt. percent__ | 58–77 |
| Aver. pore dia. _____ A__ | 70–82 |

In those instances where contact is made by suspending a finely divided catalyst in the liquefied anhydride, the mixture may contain from 1 to 15 parts by weight or more of suspended solid catalyst per 100 parts of anhydride. Since the catalyst is recovered by simple filtration and reused, the net quantity of catalyst consumed (i.e. deactivated) is but a small part of the total in any single cycle of operations.

The tetrahydrophthalic acid anhydrides suitable for the process may be any of a number of normally solid isomerizable anhydrides capable of catalytic conversion by a nuclear double bond shift to a liquid product consisting of a mixture of related isomers. The anhydrides within the scope of the invention are those responsive to the generic formula:

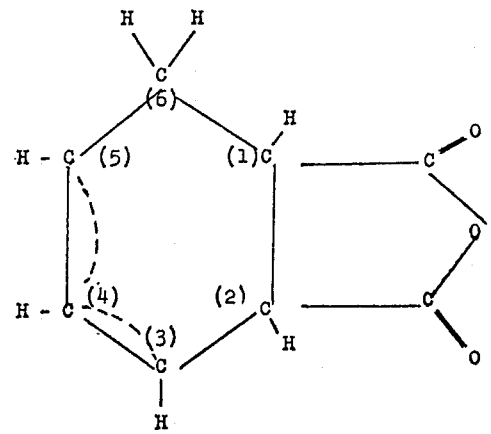

wherein the anhydride is in the 1–2 position and one isomerizable olefinic bond, as represented by the partial valences of the carbon atoms at the (3), (4) and (5) positions, is present in the cyclic nuclear structure in the delta-3 or delta-4 position, and wherein the hydrogen atoms normally present in the cyclo-olefinic ring to satisfy the quadrivalency of carbon may be substituted by $C_1$ to $C_3$ alkyl group, such as, for example the compounds:

delta-4-tetrahydro-phthalic anhydride
delta-3-tetrahydro-phthalic anhydride
4-methyl-delta-4-tetrahydro-phthalic anhydride
4-methyl-delta-3-tetrahydro-phthalic anhydride
3-methyl-delta-4-tetrahydro-phthalic anhydride
3-ethyl-delta-4-tetrahydro-phthalic anhydride
3,6-dimethyl-delta-4-tetrahydro-phthalic anhydride
4,5-dimethyl-delta-4-tetrahydro-phthalic anhydride
3,4-dimethyl-delta-4-tetrahydro-phthalic anhydride and related anhydrides derived, for example, from the condensation of maleic anhydride and/or its lower alkyl substituted derivatives with aliphatic conjugated dienes such as butadiene, isoprene, piperylene, hexadiene and their $C_1$ to $C_3$ alkyl substituents by a typical Diels-Alder or similarly effective condensation.

The following examples will serve to illustrate the method of the invention without limiting the same.

EXAMPLE I 200 parts by weight of cis delta-4-tetrahydro-phthalic anhydride (THPA) prepared from butadiene and maleic anhydride as described in Organic Syntheses, vol. 30, 93–95 (1950) and 30 parts of powdered, commercially available silica-alumina cracking catalyst insoluble in the charge were charged to a 3-necked flask fitted with a stirrer, thermometer, gas inlet and reflux condenser. A dry carbon dioxide atmosphere was maintained at all times in the reactor. The temperatures was raised to and maintained at 230° C. with constant stirring for a period of 4 hours. At the end of this time the heating was terminated and the product allowed to cool. The mixture was simply filtered at 80° C. to remove suspended catalyst solids. 150 parts by weight of a slightly red colored liquid product were recovered with no attempt made to obtain a quantitative recovery of residual liquid from the filter cake or the walls of the reaction flask.

The product was a liquid that showed no solidification in being cooled down to −50° F. (−45.5° C.), a temperature about 176° C. below the melting point of the charge. An infra red spectrogram of the liquid product exhibited typical anhydride absorption bands at 5.37 and 5.60; strong absorption at 7.9 of the delta-1-isomer; a less strong absorption at 9.9 of the delta-3-isomer and a relatively weak absorption at 10.1 of the delta-4- or charge isomeric form. There was substantially no absorption in the range of 8.9 indicating the practical absence of the delta-2-isomer. By these and other tests it was apparent that the initial delta-4-isomer had been isomerized mainly to the delta-3- and delta-1-isomers.

The liquid product was substantially free of decomposition products or polymers. Thus the entire liquid product was available for further use without distillation or other treatment. In addition to this attractive feature and the highly desirable feature of the low solidification point, this product was found to have effective activity as an epoxy resin curing agent even better than that of the unisomerized THPA.

EXAMPLE II

The liquid anhydride mixture of Example I was evaluated as an epoxy resin curing agent in comparison with unisomerized delta-4-THPA in the following formulation:

Epoxy resin (diglycidyl ether or bisphenol-A), 54.8 gm.
Anhydride curing agent, 45.2 gm. (Equivalent ratio 1.0/1.0.).
5% of 2-ethyl-4-methyl imidazole catalyst (based on total formulation weight).

The reactants were mixed at room temperature. The test composition was then placed in a 158° F. curing bath. Observations were made to note the gelling or setting time of the mix. Simultaneously it was observed that the recorded temperatures reached a maximum (exotherm) very shortly after gellation time.

The following results were obtained after curing at 158° F. to gel formation, then 48 hours at 200° F.:

| | Curing agents | |
|---|---|---|
| | Isomeric anhydride mixture of Example I | Unisomerized delta-4-THPA |
| Physical form (at room temperature) | Liquid | Solid |
| Activity in curing (min. to peak exotherm during curing) | 7.5 | 19.5 |
| Density of cured casting, g./cc. | 1.26 | 1.26 |
| Heat deflection temperature, ° C. | 131 | 132 |

Thus, with no reduction in the strength or density of the cured resin product, the mixed low melting isomers displayed almost three times the activity of the unisomerized THPA, based on the relative times to reach the peak isotherm during curing.

Other alkyl substituted tetrahydro-phthalic anhydrides within the scope of the above generic formula are similarly subject to the nuclear double bond shift under the influence of solid acidic particulate catalysts to produce mixed isomers liquid at ordinary temperatures. For example, 3-methyl-delta-4-tetrahydro-phthalic anhydride, a piperylene-maleic anhydride adduct, is of special interest since this normally solid anhydride (melting point 63° C.) has been converted to a liquid isomeric mixture which did not solidify on being cooled to a point below −40° C.

EXAMPLE III 100 g. of 3-methyl-delta-4-tetrahydro-phthalic anhydride, melting point 59–62° C., [prepared by reacting piperylene and maleic anhydride as described in Organic Syntheses, vol. 30, pages 93–95 (1950) for butadiene and maleic anhydride].

15 g. of powdered coprecipitated silica-alumina (87.5) wt. percent $SiO_2$–12.5 wt. percent $Al_2O_3$) hydrocarbon cracking catalyst (surface area 425 m.$^2$/g.; avg. pore diameter 70A; bulk density 0.84 kg./l).

were heated under a dry nitrogen gas atmosphere for 1.5 hours at 220–230° C. with vigorous stirring throughout the reaction period. At the end of this time the reactor and its contents were cooled to 80° C. and filtered with about 20 g. of added filter aid. Clear filtrate was recovered which did not solidify on being cooled to a temperature of about −50° F. (−45.5° C.). The infrared spectrogram of the product showed anhydride bands at 5.37 and 5.60. The total liquid product consisting of a mixture of 3-methyl-tetrahydro-phthalic anhydride isomers with shifted olefin bonds was used without fractionation in curing a diglycidyl ether of bisphenol-A.

EXAMPLE IV 1 equiv.; 54.8 g. of resin (diglycidyl ether of bisphenol-A)
1 equiv.; 45.3 g. of isomerized adduct, liquid 3-methyl-tetrahydro-phthalic anhydride from Example III (anhydride equivalent of 166), and
5.1 g. of liquid 2-ethyl-4-methyl imidazole catalyst, (9.3 parts per hundred of resin);

were mixed at room temperature, then heated in a 158° F. bath to gelling. Gellation was effected in 19.5 minutes. The gelling rate was equivalent to that for unisomerized THPA, i.e., 19.5 minutes to maximum exotherm (as shown for THPA in Example II). The casting was then subjected to a post cure of 48 hours at 200° F., after which time it showed good hardness and a density of 1.20 g./cc.

EXAMPLE V

The Diels-Alder adduct product of maleic anhydride and isoprene, melting at 66–68° C. was prepared by reacting isoprene and molten maleic anhydride (melting point 58° C.) at 60° C. The reaction was exothermic and practically quantitive, giving a 99.6% yield by weight of 4 methyl-Δ-4 THPA. The product was isomerized directly, without further purification or distillation, as follows:

Two hundred grams of 4 methyl-delta-4-THPA were heated under dry nitrogen with 15 g. (7.5% by weight) of silica-alumina cracking catalyst with stirring and heating at 180° C. for 6 hours. After cooling and filtering off the silica-alumina, 196 g. of a light yellow product were recovered having a solidification temperature of 4° C.

The isomerized product had the following properties:

N 23/D (spec. dispersion) _____ 1.4994
d 25°/4° C. _____ 1.1974
Neut. equiv. _____ 99
Neut. equiv. (theory) _____ 92
Color (Gardener) _____ 4

The above liquid isomerized product was evaluated, vis-a-vis 4-methyl-Δ-4 THPA, in an epoxy-anhydride formulation as in Example IV.

In a curing bath at 158° F. gellation was effected in 14.5 minutes, a notably shorter time than 19.5 minutes for unisomerized THPA. After a post cure of 24 hours at 149° C., the cured sample had a heat deflection temperature of 143° C. compared to 131° C. and 132° C. for isomerized and unisomerized THPA respectively.

In similar runs made at

200° C. for 3 hours and
230° C. for 1 hour isomeric products with solidification points of 4° C. were obtained.

EXAMPLE VI

Using another commercial sample of silica-alumina cracking catalyst having 13% alumina–87% silica and a surface area of 463 m.²/g., an isomerization run was made similar to Example V:

200 g. of 4-methyl-delta-4 tetrahydrophthalic anhydride were mixed and heated with 15 g. (7.5 wt. percent) of the above silica-alumina under a dry nitrogen atmosphere for 2.5 hours at 180° C. After cooling to 80° C., the product recovered by filtering off the solid catalyst weighed 198 g. and had a solidification point of −12° C.

The disadvantage of working with such solid high melting epoxy curing agents is illustrated by a typical procedure using unisomerized tetrahydro-phthalic anhydride melting at about 103° C. The solid anhydride is liquified by heating and soaking at a temperature above 103° C. for several hours. The epoxy resin similarly is heated to well above 100° C. to blend with the liquefied anhydride without anhydride separation. Immediately on mixing at 100° C. or above the mixture is reactive. To obtain a suitable working time or shelf life the mix normally is cooled to 60° C.–80° C. or below to avoid spontaneous interaction and setting up of the anhydride epoxy resin. Cooling to too low a temperature must be avoided to prevent anhydride crystallization from the epoxy resin.

The sharp effect of temperature on the shelf life of an anhydride-epoxy system is shown for mixes of liquid resin and liquid organic acid anhydride cross linking agent described in Example II.

| Temp. °C. | Pot life (gelling time), hr. |
|---|---|
| 60 | 20 |
| 80 | 14 |
| 100 | 10 |
| 120 | 6 |
| 140 | 3 |

From this it appears that temperatures below 80° C. may provide a practical pot life for the mix of at least twelve hours. Yet with normally solid anhydrides a temperature above 80° C. is generally required to avoid the separation of solid anhydride from the resin.

The ratio of equivalents of anhydride to expoxide are generally 1/1 for the formation of polyesters, or somewhat less than 1/1 with anhydride catalyzed self polymerization of epoxides to polyethers. Since such catalyzed self-polymerization consumes no anhydride but does consume hydroxides and epoxides, the equivalence of anhydride to epoxide may be from 0.65 molar to 1.0 molar, with 0.85/1.0 accepted as desirable for most epoxide formulations.

In order to maximize yields, it is preferred to carry out the isomerization in a dry inert atmosphere such as, for example, in an atmosphere of carbon dioxide or nitrogen. Carboxylic acids or anhydrides may tend to release carbon dioxide by decarboxylation on heating and $CO_2$ might tend to depress the decarboxylation reaction. However, dry inert gases other than $CO_2$ or $N_2$, such as helium, argon and methane appear to act in a similar manner, either in sparing the decarboxylation of the acid or anhydride or in maintaining anhydrous conditions.

I claim:
1. A catalytic process for inducing a nuclear double bond shift in a tetrahydrophthalic anhydride to effect conversion thereof to isomeric anhydrides thereof which are normally liquid, comprising the steps of:
 (a) heating a normally solid tetrahydrophthalic anhydride selected from the group consisting of: delta-3-tetrahydrophthalic anhydride, delta-4-tetrahydrophthalic anhydride and $C_1$ to $C_3$ alkyl-substituted derivatives thereof to its liquefaction temperature;
 (b) contacting the liquefied anhydride with a solid particulate acidic siliceous cracking catalyst which is insoluble in said anhydride, said catalyst having a quinoline number of at least 0.01; and
 (c) maintaining said anhydride in contact with said catalyst at a temperature in the range of 100° C. to 250° C., for a period of time ranging from 5 minutes to 8 hours, and at a pressure in the range of 1 to 5 atmospheres, whereby a nuclear bond shift occurs and normally liquid isomers are formed.
2. The method of claim 1 which includes the additional step of separating the catalyst from the liquid isomers, in its original form, suitable for reuse.
3. The method of claim 1 wherein, further, the isomerization is performed in an inert atmosphere.
4. The method of claim 3 which includes the additional step of separating the catalyst from the liquid isomers, in its original form, suitable for reuse.
5. The method of claim 1 wherein the normally solid anhydride is delta-3-tetrahydrophthalic anhydride.
6. The method of claim 5 which includes the additional step of separating the catalyst from the liquid isomers, in its original form, suitable for reuse.
7. The method of claim 1 wherein the normally solid anhydride is delta-4-tetrahydrophthalic anhydride.
8. The method of claim 7 which includes the additional step of separating the catalyst from the liquid isomers, in its original form, suitable for reuse.
9. A method of preparing normally liquid isomers of normally solid tetrahydrophthalic anhydrides comprising:
 (a) heating a normally solid tetrahydrophthalic anhydride responsive to the structural formula:

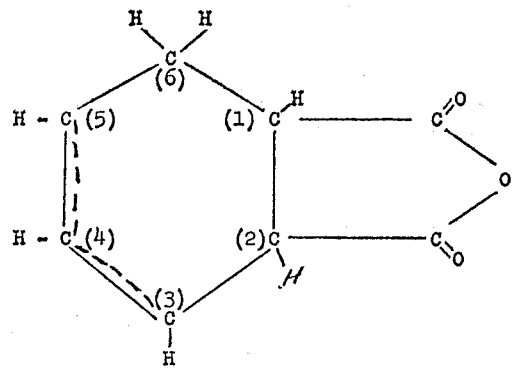

wherein the anhydride is in the 1–2 position and an isomerizable olefinic bond, as represented by the partial valences of the carbon atoms at the (3), (4), and (5) positions, is present in the cyclic nuclear structure in the delta-3 or delta-4 position, and wherein the hydrogen atoms normally present in the cyclo olefinic ring to satisfy the quadrivalency of carbon may be substituted by $C_1$–$C_3$ alkyl groups, to a temperature at least as high as its melting point;
 (b) contacting the thus liquefied anhydride with a solid particulate acidic siliceous cracking catalyst having a quinoline number in the range of 0.01 to 0.09, said catalyst being insoluble in said liquefied anhydride;
 (c) maintaining said anhydride in contact with said catalyst under conditions which include a temperature in the range of 100° C. to 250° C., and pressures in the range of from 1 to 5 atmospheres for a period of time ranging from 5 minutes to 8 hours, whereby isomerization occurs, and (d) separating the catalyst, in its original form-suitable for reuse, from the normally liquid isomers.

10. The method of claim 9 whrein said reaction is performed in a dry inert atmosphere.

11. The method of claim 10 wherein the normally solid anhydride is delta-4-tetrahydro-phthalic anhydride.

12. The method of claim 10 wherein the normally solid anhydride is 3-methyl-delta-4-tetrahydro-phthalic anhydride.

13. The method of claim 10 wherein the normally solid anhydride is 4-methyl-delta-4-tetrahydrophthalic anhydride.

References Cited

UNITED STATES PATENTS

| 2,959,599 | 11/1960 | Bailey | 260—346.3 |
| 3,236,909 | 2/1966 | Winnick | 252—455 |
| 2,764,597 | 9/1956 | Barney | 260—346.3 |

ALEX MAZEL, Primary Examiner

R. F. DENTZ, Assistant Examiner

PO-1050
(5/69)

UNITED STATES PATENT OFFICE
CERTIFICATE OF CORRECTION

Patent No. 3,470,214            Dated September 30, 1969

Inventor(s) Freeman M. Young

It is certified that error appears in the above-identified patent and that said Letters Patent are hereby corrected as shown below:

Column 2, line 5, after "50%" insert -- silica and from 5 to 50% --.

Column 5, line 4, "temperatures" should be singular.

Column 5, line 40, "or" within the parentheses should be -- of --.

Column 7, line 26, "liquified" should be -- liquefied --.

Claim 4, line 1, after "method" insert -- of --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents